United States Patent
Tidestav

(10) Patent No.: US 8,112,049 B2
(45) Date of Patent: Feb. 7, 2012

(54) CHANNEL QUALITY HANDLING FOR PRECODER OVERRIDE

(75) Inventor: Claes Tidestav, Bålsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 228 days.

(21) Appl. No.: 12/640,367

(22) Filed: Dec. 17, 2009

(65) Prior Publication Data

US 2011/0149914 A1    Jun. 23, 2011

(51) Int. Cl.
*H04B 1/04* (2006.01)

(52) U.S. Cl. ......... 455/129; 455/102; 375/267; 375/285

(58) Field of Classification Search ........... 455/129, 455/101–102, 450–453, 509; 375/267, 285, 375/296; 370/335, 329

See application file for complete search history.

(56) References Cited

U.S. PATENT DOCUMENTS

| | | | |
|---|---|---|---|
| 7,949,318 B2* | 5/2011 | Prasad et al. ................. | 455/129 |
| 2004/0190486 A1 | 9/2004 | Oshiba | |
| 2008/0165875 A1 | 7/2008 | Mundarath et al. | |
| 2008/0186918 A1* | 8/2008 | Tinnakornsrisuphap et al. ............................ | 370/331 |
| 2009/0034639 A1* | 2/2009 | Hwang et al. ................. | 375/260 |
| 2009/0042511 A1* | 2/2009 | Malladi .......................... | 455/62 |
| 2009/0046788 A1* | 2/2009 | Kotecha ......................... | 375/260 |
| 2009/0181708 A1* | 7/2009 | Kim et al. ...................... | 455/501 |
| 2010/0027713 A1* | 2/2010 | Huang et al. .................. | 375/296 |
| 2010/0232384 A1* | 9/2010 | Farajidana et al. ........... | 370/329 |
| 2010/0322333 A1* | 12/2010 | Goransson et al. ........... | 375/260 |
| 2011/0002410 A1* | 1/2011 | Forenza et al. ................ | 375/267 |
| 2011/0032839 A1* | 2/2011 | Chen et al. .................... | 370/252 |

FOREIGN PATENT DOCUMENTS

| | | |
|---|---|---|
| WO | WO 2008/042813 A2 | 4/2008 |
| WO | WO 2008/104907 A2 | 9/2008 |
| WO | WO 2009/023379 A1 | 2/2009 |

OTHER PUBLICATIONS

International Search Report mailed Mar. 11, 2011 in corresponding Application No. PCT/SE2010/051387.

* cited by examiner

*Primary Examiner* — Dominic E Rego
(74) *Attorney, Agent, or Firm* — Nixon & Vanderhye P.C.

(57) ABSTRACT

Technology is described that allows the transmitter to make different channel quality adjustments to reported channel quality information for use in allocating resources for subsequent transmissions depending on whether a precoder recommendation is used or overridden. When a reported precoder recommendation is overridden in favor of an alternate precoder, a different channel quality adjustment value associated with the alternate precoder is used, which results in improved transmission performance.

23 Claims, 6 Drawing Sheets

CHANNEL QUALITY HANDLING FOR PRECODER OVERRIDE

TECHNICAL FIELD

The technical field relates to radio communications that precode signals to be transmitted, and in a particular example application, to multiple-input multiple-output (MIMO) based systems that employ MIMO precoder recommendations.

BACKGROUND

In a typical radio communications system, radio communications terminals, referred to as radio terminals or user equipment terminals UEs, communicate via an access network with other networks like the Internet. For example, a radio access network (RAN) in a cellular communications system covers a geographical area which is divided into coverage cells, with each cell being served by a base station, e.g., a radio base station (RBS), which in some networks is also called a "Node B" or an evolved Node B "eNodeB." Each base station typically serves several cells. One common deployment is 3-cell base station installations, where a base station serves three cells. Other wireless systems, like WiFi systems, employ access points (APs) to provide network access to wireless terminals. For simplicity, wireless access points, radio base stations, and the like are referred to generally as base stations and user equipment terminals, access terminals, and the like are referred to generally as radio terminals.

A base station communicates over the air interface operating on radio frequencies with the radio terminals within range of the base stations. The radio signals may either be dedicated signals to and from specific radio terminals, multicast signals intended for a subset of the radio terminals in a cell or coverage area, or broadcast signals from the base station to all radio terminals in a cell or coverage area. For simplicity, a cell is understood to include a radio coverage area or the like. A base station broadcasts information to all the radio terminals in a cell using the broadcast channel of the serving cell. Each cell is identified by a cell identifier within the local radio area, which is broadcast in the cell.

Current cellular radio systems include for example Third Generation (3G) Universal Mobile Telecommunications System (UMTS) operating using Wideband Code Division Multiple Access (WCDMA). WCDMA systems, like many modern mobile communication systems, use link adaptation. Link adaptation allows the radio channel coding rate and modulation scheme to be chosen based on detected channel quality, e.g., based on channel quality indicator (CQI) reports. These reports are formulated at the receiver to reflect channel quality and interference levels detected in received signals from a transmitter, and the receiver then transmits the report over a signaling channel back to the transmitter. The transmitter uses the CQI reports to select appropriate transmission resources such as an appropriate channel coding rate and modulation scheme, e.g., a coding rate and modulation scheme that allows transmission of as much user data as possible using as little resources as possible given the current conditions.

Another feature in modern mobile communication systems is multiple-input multiple-output (MIMO) technology including precoding. MIMO uses multiple antennas at a transmitter and multiple antennas at a single receiver or one or more antennas at multiple receivers (depending on the implementation). In general, MIMO wireless communication systems exhibit increased data throughput (due to higher spectral efficiency) and increased link range (due to reduced fading) without requiring additional bandwidth or transmit power, respectively (as contrasted with multiple-input single-output (MISO), single-input multiple-output (SIMO), and single-input single-output (SISO) wireless communication systems). MIMO wireless communication systems generally employ precoding, spatial multiplexing (SM), diversity coding, a combination of SM and precoding, or a combination of SM and diversity coding.

With precoding, the signal transmitted from each of the multiple antennas at the same time is scaled (amplified and phase shifted). A set of such scaling factors is called a precoding vector. With this precoding, beam-forming is effectively applied to the signal.

In addition to sending CQI reports, a mobile terminal may also send a base station a precoding vector recommendation to the base station. Normally, the base station uses the precoding vector that the mobile terminal recommends, and the link adaptation functionality in the base station uses the corresponding CQI report. As a result, a relatively tight control of the resulting block error rate (BLER) can be obtained, which can lead to good system performance.

The CQI report is valid if the base station uses the recommended precoding vector. But in some circumstances, using the recommended precoding vector may lead to an undesirable situation, e.g., a power imbalance between the transmitter antennas that can result in a significant performance penalty. One antenna power imbalance example is when a single-stream transmission is used for some of the precoder vectors.

To circumvent this kind of situation, the base station may override the precoder recommendation and use an alternate precoder. A problem with doing this is that the CQI value tied to the reported precoder recommendation is not necessarily accurate for the alternate precoder. In this situation, the CQI value may well overestimate (or underestimate) the channel quality, leading to an excessive BLER (or inefficient use of radio resources), and thus, poor performance.

One way to correct for inaccurate CQI values in general is to compare the desired block error rate (BLER) with the observed block error rate (BLER). If the CQI values are accurate, these two quantities should coincide on average. If they do not coincide, an offset may be used to adjust the reported channel quality (CQ) until the observed BLER coincides with the target BLER. This correction technique is referred to here as "CQ adjustment."

If CQ adjustment is applied when the precoders are sometimes overridden and sometimes not, the resulting offset will converge to a value between the two offset values corresponding to precoder override and no precoder override. Typically, this will result in a BLER that is too low when the precoder is not overridden and too high when the precoder is overridden.

SUMMARY

Technology is described that allows the transmitter to make different channel quality adjustments to reported channel quality information for use in allocating resources for subsequent transmissions depending on whether a precoder recommendation is used or overridden. When a reported precoder recommendation is overridden in favor of an alternate precoder, a different channel quality adjustment value associated with the alternate precoder is used, which results in improved transmission performance.

A method and apparatus are provided for use in a first radio communication device in a wireless communication system. A recommended precoder information and channel quality information are received from a second radio communication device. The recommended precoder information is associated with a recommended precoder, and the channel quality information is associated with the recommended precoder. The recommended precoder or a different, first alternate precoder is selected for a transmission to the second radio communication device. A first channel quality adjustment is determined when the recommended precoder is selected. A different, second channel quality adjustment is determined when the first alternate precoder is selected. The channel quality information to use for transmission is adjusted based on the determined channel quality adjustment. Transmission resources are then allocated based on the adjusted channel quality information. A signal to be transmitted to the second radio communications device is precoded in accordance with the selected precoder, and the precoded signal is transmitted to the second radio communication device using the transmission resources allocated based on the adjusted channel quality information.

In one non-limiting example application, the wireless communication system is a multiple-input multiple-output (MIMO) wireless communication system, and the transmission is a MIMO transmission of the precoded signal.

In one non-limiting example embodiment, the alternate channel quality adjustment may be based on the first channel quality adjustment combined with an offset. The first channel quality adjustment is determined based on multiple prior transmissions to the second radio communications device including prior transmissions where the recommended precoder was selected and prior transmissions where the first alternate precoder was selected. The offset may be a fixed value or a variable value. The first channel quality adjustment can be determined in one example way based on an error rate associated with actual prior transmissions to the second radio communications device where the recommended precoder was selected and where the first alternate precoder was selected and a desired error rate. The variable offset value may be determined based on a desired error rate and an error rate associated with actual prior transmissions to the second radio communications device where the first alternate precoder was selected.

In another non-limiting example embodiment, the first channel quality adjustment may be based on multiple prior transmissions to the second radio communications device including prior transmissions where the recommended precoder was selected. The second channel quality adjustment may be determined based on multiple prior transmissions to the second radio communications device including prior transmissions where the first alternate precoder was selected.

More than one alternate precoder may be used. For example, if there is a selection of a second alternate precoder for a transmission to the second radio communication device, a third channel quality adjustment for the second alternate precoder may be determined that is different from the first and second channel quality adjustments.

For one non-limiting example application, the first radio communication device may be a base station, and the second radio communication device may be a user equipment terminal. A non-limiting example of a radio communications system is a wideband code division multiple access (WCDMA) based system.

DETAILED DESCRIPTION

In the following description, for purposes of explanation and non-limitation, specific details are set forth, such as particular nodes, functional entities, techniques, protocols, standards, etc. in order to provide an understanding of the described technology. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), programmable logic arrays, and/or using one or more digital signal processors (DSPs). Although the description below is in terms of multiple input multiple output (MIMO) transmissions with at least the transmitter using multiple antennas, the technology is not so limited and made be used in systems where the receiver uses only a single antenna.

Figure 1:
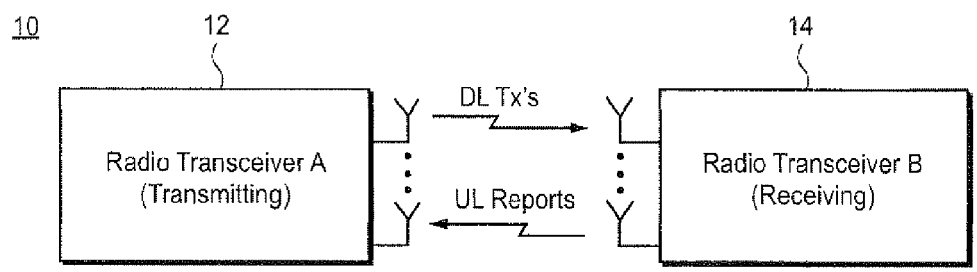
FIG. 1 is a function block diagram of a wireless communication system in which a radio transceiver is transmitting to another radio transceiver using a multiple input multiple output (MIMO) transmission format.

FIG. 1 illustrates a wireless communication system 10 that includes a radio transceiver A, identified by reference numeral 12, and a receiving radio transceiver B, identified by reference numeral 14. The transceiver A transmits downlink transmissions, e.g., multiple input multiple output (MIMO) transmissions over multiple antennas, to the receiving transceiver B. Based on those received downlink transmission(s), the receiving transceiver B generates uplink reports that are regularly transmitted back to the transceiver A. The uplink reports include among other things channel quality information (CQI) and precoding vector information (PCI).

Figure 2:
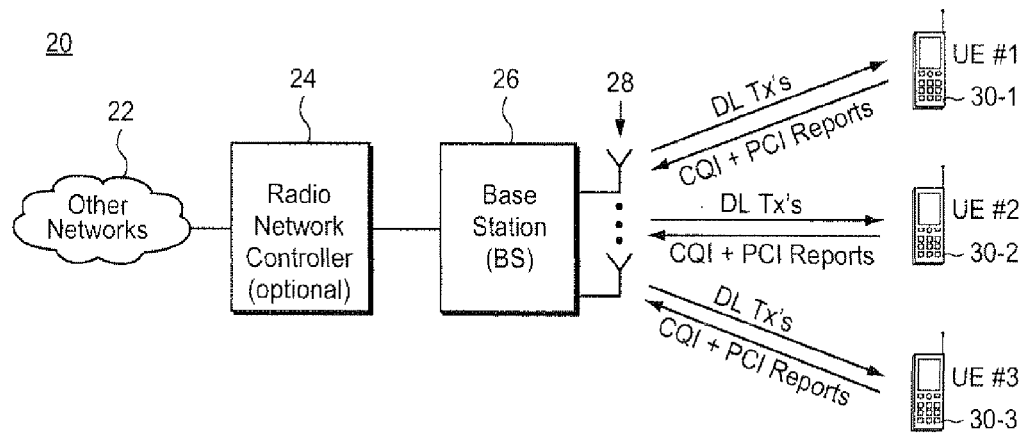
FIG. 2 is a non-limiting, example function block diagram of a wideband code division multiple access (WCDMA) radio communication system.

FIG. 2 illustrates a non-limiting, example wideband code division multiple access (WCDMA) based communication system 20. A base station 26 having multiple antennas 28 communicates with multiple (three are shown for example) user equipments (UEs) 30-1, 30-2, and 30-3. As in FIG. 1, the individual UEs 30 receive downlink transmissions from the base station 26 and generate CQI and PCI reports that are regularly transmitted on the uplink back to base station 26. The base station is coupled to an optional radio network controller 24 which provides a gateway to other networks such as core networks, the public switch telephone network (PSTN), the internet, etc. The WCDMA-based system 20 is just one non-limiting example of a wireless communication system in which the technology in this application may be utilized.

A brief description is now provided of link adaptation procedures (one example of how resources may be allocated) that are preferably used in the example communication systems shown in FIGS. 1 and 2. Link adaptation may include an outer control loop to maintain the actual block error rate (BLER) for the transmitter-to-receiver communication close to a predetermined target or desired BLER. Assume that the receiver estimates the channel quality for the transmitter-to-receiver communication and reports a CQI value $CQI_{rep}$. Before using $CQI_{rep}$ in the link adaptation, the transmitter adds an offset $\Delta CQI$ to the reported CQI:

$$CQI_{used} = CQI_{rep} + \Delta CQI$$

The outer control loop adjusts $\Delta CQI$ so that the actual BLER will be close to a predetermined BLER target. The actual BLER is estimated based on ACK/NACK reports transmitted from the receiver: for each data block correctly received, an ACK is received, and for each block that is incorrectly received, a NACK is received. Assume that during a certain time period N1 ACKs and N2 NACKs are received. One example way to estimate the actual BLER is as follows:

$$BLER_{ACTUAL} = N2/(N1+N2)$$

If the actual BLER is higher than the BLER target, then the used CQI value ($CQI_{used}$) is too optimistic, i.e., it overestimates the channel quality. In this case, the outer control loop decreases $\Delta CQI$. On the other hand, if the actual BLER is lower than the BLER target, the value of $CQI_{used}$ is too pessimistic, i.e., the channel quality has been underestimated, and the outer control loop increases $\Delta CQI$. Such an algorithm is commonly known as CQI or CQ adjustment.

CQI adjustment is necessary to compensate for systematic errors in the CQI values reported from the receiver. Since the CQI adjustment is a relatively slow process, it can only effectively compensate for errors that are relatively constant. The assumption is that all CQI reports are associated with (approximately) the same error. If different reports are associated with different errors, one CQI adjustment algorithm still adjusts $\Delta CQI$ so that the average BLER is close to the BLER target. However, the resulting performance is relatively poor because some of the transmissions have a larger BLER while others have a significantly lower BLER. To improve performance, it is desirable to have similar BLERs for all transmissions.

Many CQI reports may have approximately the same inaccuracy so that a single CQI adjustment using one CQI adjustment value for all transmissions may suffice. But there are situations where the CQI reports may have different inaccuracies. An example of this latter situation is when the transmitter needs to override the precoder recommendation from the UE.

Figure 3:
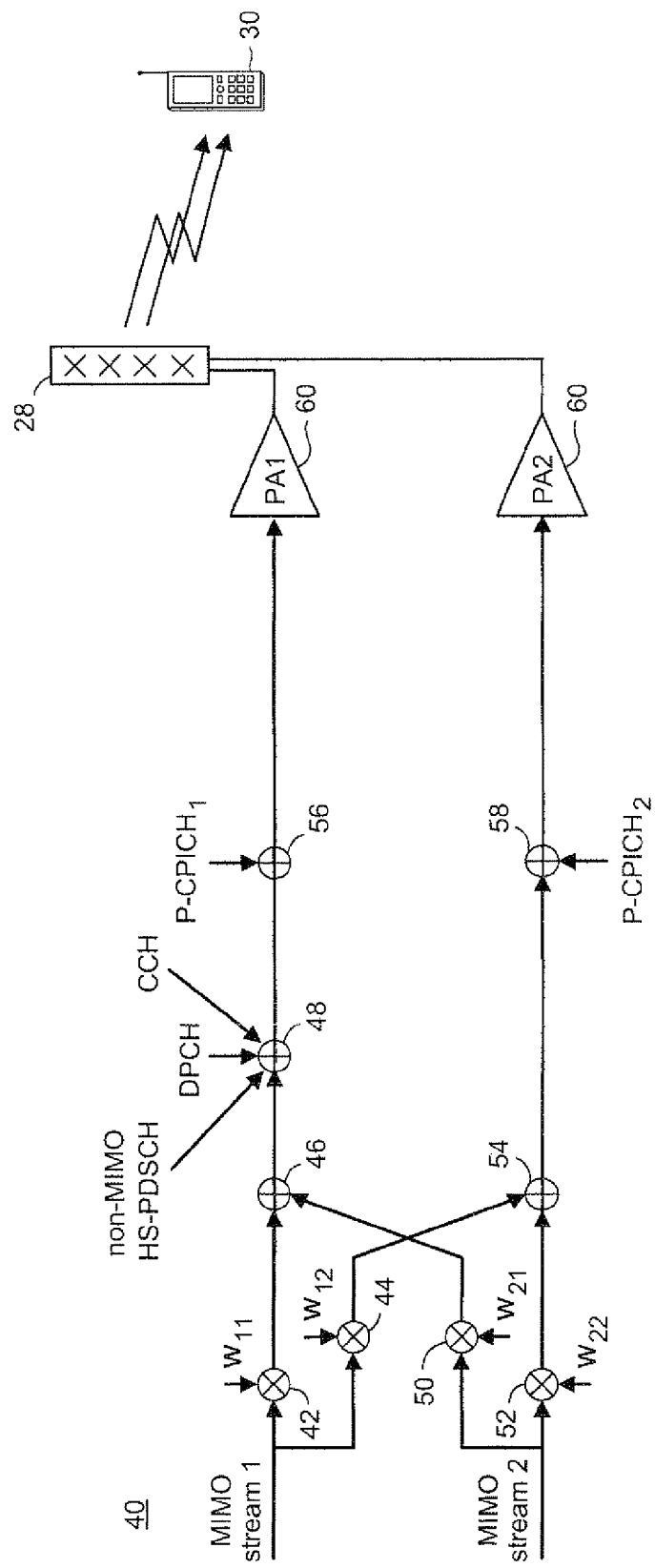
FIG. 3 is a schematic showing an example MIMO transmission using individual precoding vectors.

Precoding is used with closed-loop MIMO transmission. A simple precoding example is now described in conjunction with FIG. 3 which shows a simplified WCDMA-based communication system where a base station 40 processes and transmits two MIMO streams 1 and 2. MIMO stream 1 is provided to multipliers 42 and 44 where it is multiplied by weights $W_{11}$ and $W_{12}$, respectively. Similarly, MIMO stream 2 is provided to multipliers 50 and 52 where the stream is multiplied by weights $W_{21}$ and $W_{22}$, respectively. Together, weights $W_{11}$ and $W_{12}$ correspond to a first precoder vector used to precode stream 1, and $W_{21}$ and $W_{22}$ correspond to a second precoder vector used to precode stream 2. The values of $W_{11}$ and $W_{12}$ typically depend on the precoder recommendation from the UE 30 to the base station 40. The second precoder $W_{21}$ and $W_{22}$ used to precode stream 2 should be orthogonal to the first precoding vector. In addition, the second precoding vector weights can typically be determined from the first precoding weights.

The outputs of multiplier 42 and multiplier 50 are summed in summer 46, and the output of summer 46 is provided to summer 48 and combined with other channel information such as non-MIMO data such as that on the high-speed physical downlink shared channel (HS-PDSCH) as well as information from a dedicated physical channel (DPCH) and control information from a control channel (CCH). The output of summer 48 is combined in summer 56 with a Primary Common Pilot Channel (P-CPICH$_1$). The output of summer 56 is then amplified in power amplifier 60 and provided to an antenna array 28. Summer 54 combines the outputs of multipliers 44 and 52. The output of summer 54 is combined with a second primary common pilot channel (P-CPICH$_2$). The output of summer 58 is provided to a second power amplifier 62, and the amplified signal is sent to the antenna array 28 for MIMO transmission to one or more UEs 30.

Figure 4:
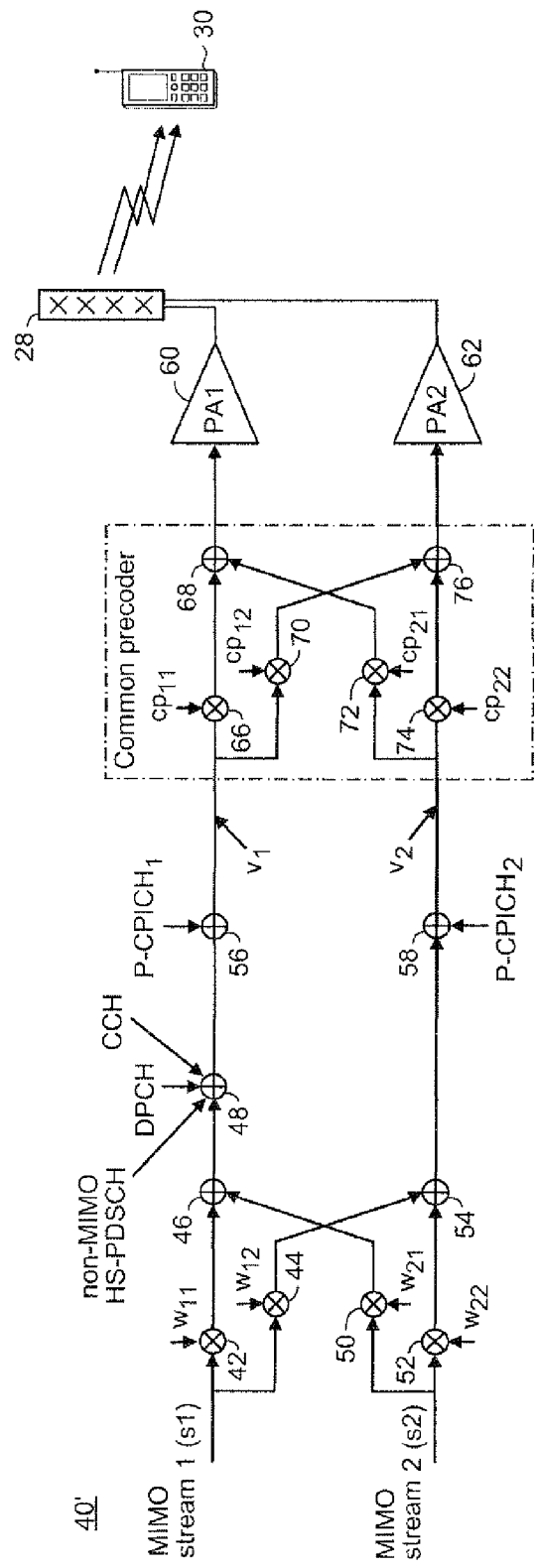
FIG. 4 is a schematic showing an example MIMO transmission with individual precoding vectors and a common precoding vectors.

FIG. 4 shows another example base station MIMO system 40' in which the outputs of summers 56 and 58 are processed in a common precoder. The common precoder is another precoder introduced to balance the transmit power of the legacy channels DPCH, CCH, and the non-MIMO HS-PDSCH. The common precoder includes weights $CP_{11}$, $C_{12}$, $CP_{21}$, and $CP_{22}$ which are combined with the various signals as shown using multipliers 66, 70, 72, and 74. Summer 68 combines the outputs of multipliers 66 and 72, and summer 76 combines the outputs of multiplier 70 and 74. The outputs of summers 68 and 76 are amplified in power amplifiers 60 and 62, respectively, and transmitted via the MIMO antenna array 28 to one or more mobile terminals 30. The combination of some of the recommended precoder values $W_{11}$, $W_{12}$, $W_{21}$, $W_{22}$ and the common precoder values $CP_{11}$, $CP_{12}$, $CP_{21}$, and $CP_{22}$ may lead to a situation where the power becomes unbalanced for some values of the recommended precoder $W_{11}$, and $W_{12}$. In this situation, it is better for the base station to override the precoder recommendation, i.e., not follow the precoder recommendation and use an alternate precoder. There may be other situations where it is desirable to not follow the UE's precoder recommendation.

To summarize, with each CQI report, the UE includes a precoder recommendation and corresponding CQI. The base station may choose to use or not to use the recommended precoder, but the reported CQI that is associated with the precoder recommendation is only accurate if the recommended precoder is actually used. If another precoder is used, the CQI value will likely be inaccurate, e.g., too optimistic.

Because the transmitter knows when it is overriding a precoder recommendation, the transmitter can apply a different CQ adjustment that is better suited for the alternate precoder actually used. Consider the following example.

If a base station does not use the recommended precoder, a fixed, alternate precoder replacement strategy is used. Assume there are four possible precoders. Of these four, assume that precoders 1 and 3 are forbidden or should otherwise preferably not be used, and that precoders 2 and 4 are allowed. The following override strategy may then be used:

Precoder 1 recommended→precoder 2 used
Precoder 2 recommended→precoder 2 used
Precoder 3 recommended→precoder 4 used
Precoder 4 recommended→precoder 4 used When precoder 1 or 3 is recommended, that recommendation is overridden, and alternate precoders 2 and 4, respectively, are selected and used instead. A different channel quality adjustment may be used when recommended precoders 1 and 3 are overridden from the channel quality adjustment typically followed for recommended precoders 2 and 4.

Figure 5:
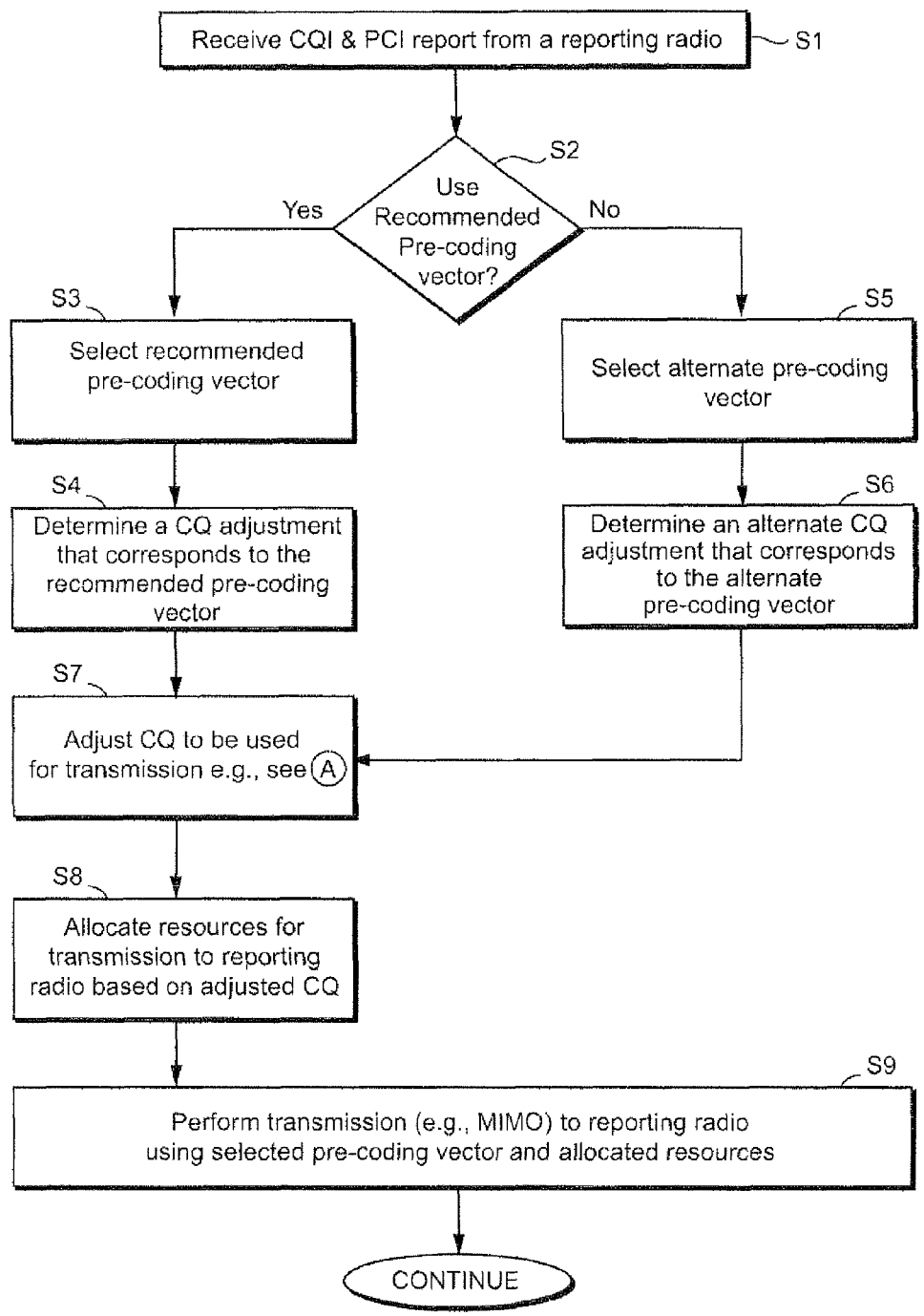
FIG. 5 is a flow chart diagram illustrating non-limiting, example procedures for reported adjusting channel quality information used in radio resource allocation (which includes link adaptation) based on a selected precoding vector.

FIG. 5 illustrates a flowchart outlining non-limiting example procedures for determining an appropriate channel quality adjustment corresponding to a selected precoding vector. Step S1 indicates that the transmitting node has received CQI and PCI reports from a receiving radio. A decision is made in step S2 whether to use the recommended precoding vector information provided in that received report. If so, the recommended precoding vector is selected (step S3), and a channel quality (CQ) adjustment that corresponds to the recommended precoding vector is determined (step S4). If the recommended precoding vector is not to be used, such as in the transmission power imbalance situation described in conjunction with FIG. 4, then an alternate precoding vector is selected (step S5). An alternative channel quality adjustment value is also determined that corresponds to the alternate precoding vector (step S6).

The flow from steps S4 and S6 proceeds to step S7 where the channel quality information is adjusted in accordance with an appropriate routine. One example of such a CQ adjustment routine (identified by the letter A) is described below in conjunction with the flowchart FIG. 6. Proceeding from step S7, radio resources are allocated for transmission to the reporting radio based on the adjusted channel quality (step S8). The transmission is then performed to the reporting radio using the selected precoding vector and the allocated resources (step S9). Although the procedures illustrated for FIG. 5 are not limited to MIMO transmissions, a non-limiting advantageous application of those procedures is to a MIMO transmission.

Figure 6:
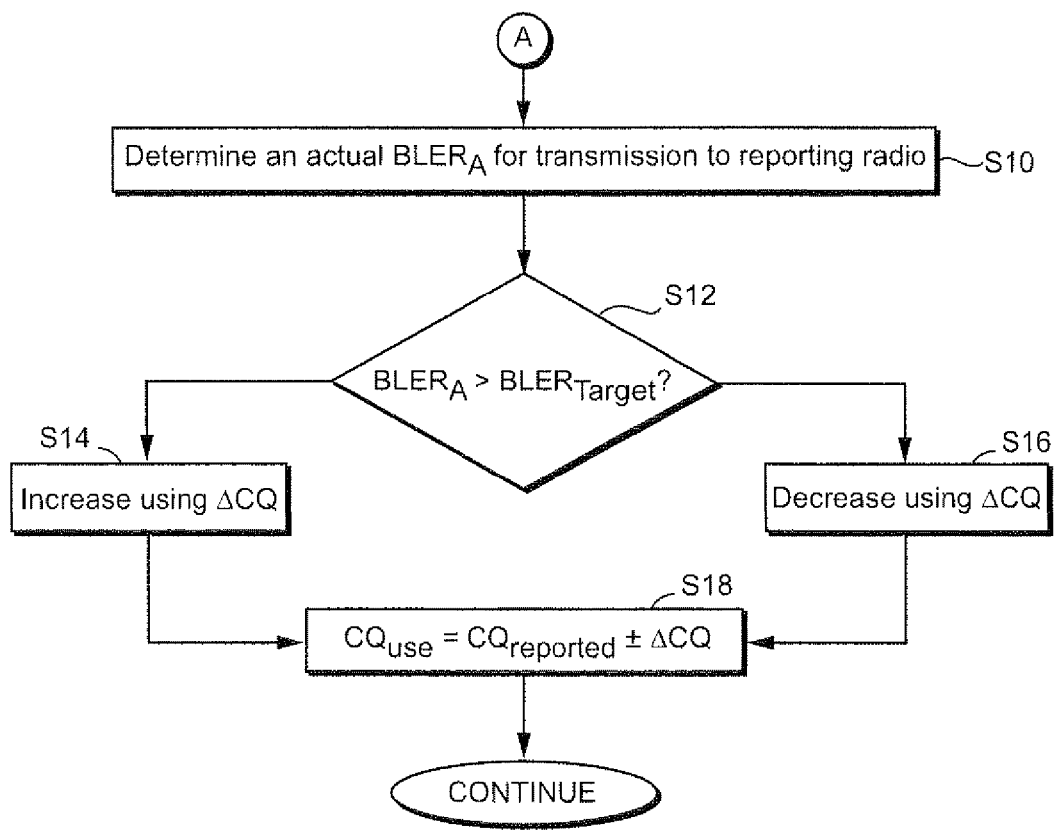
FIG. 6 is a flow chart diagram illustrating a non-limiting, example set of procedures for adjusting channel quality information.

The flowchart procedures in FIG. 6 illustrate how to adjust a reported channel quality value using a channel quality adjustment value received from step S4 or S6. An actual block error rate ($BLER_A$) is determined for transmission(s) to the reporting radio (step S10). A decision is made whether the actual $BLER_A$ exceeds a desired or target block error rate $BLER_{Target}$ (step S12). If it does, then the channel quality value may be increased using a channel quality adjustment ($\Delta CQ$) (steps S14 and S18). If the actual block error rate does not exceed the target, then the channel quality may be decreased using the channel quality adjustment value (steps S16 and S18). Step S18 shows how the channel quality actually used equals the reported channel quality plus or minus the determined channel quality adjustment value ($\Delta CQ$).

There are various ways in which a suitable value for the different channel quality adjustments may be determined. For ease of reference in the following examples, $\Delta CQI1$ is defined as the CQ adjustment applied when the precoder recommendation is used, i.e., under normal circumstances, and $\Delta CQI2$ is defined as the CQ adjustment applied when the precoder recommendation is overridden and an alternate precoder is used.

In one non-limiting example implementation, the value of $\Delta CQI1$ is based on a certain number of prior transmissions to the receiver regardless of the precoder used. A fixed constant offset $\Delta$ is then added to $\Delta CQI1$ for transmissions where the precoder recommendation is overridden to generate $\Delta CQI2$: $\Delta CQI2 = \Delta CQI1 + \Delta$, where $\Delta$ is fixed. The fixed constant offset $\Delta$ may be determined using simulations for example or by using some other method. Alternatively, a variable offset $\Delta$ may be added to $\Delta CQI1$ for transmissions where the precoder recommendation is overridden. The variable offset $\Delta$ is then updated based on prior transmissions specifically directed to the receiver where the precoder recommendation is overridden.

In another non-limiting example implementation, the value of $\Delta CQI1$ is determined based on a certain number of prior transmissions to the receiver specifically where the recommended precoder is used as opposed to the example just described where the certain number of prior transmissions to the receiver included both those where the recommended precoder is used and those where an alternate precoder is used. The value of $\Delta CQI2$ is determined based on transmissions to the receiver specifically where the alternate precoder is used, again, as opposed to the example just described where the certain number of prior transmissions to the receiver included both those where the recommended precoder is used and those where an alternate precoder is used.

Different CQ adjustments may be used for different alternate precoders when the recommended precoder is overriden. In the example above, one adjustment loop may be used for the override "use precoder 2 although precoder 1 was recommended" and another adjustment for the override "use precoder 4 although precoder 3 was recommended." As before, the described CQ adjustment algorithm may be used for the cases when the precoder recommendation was used.

Figure 7:
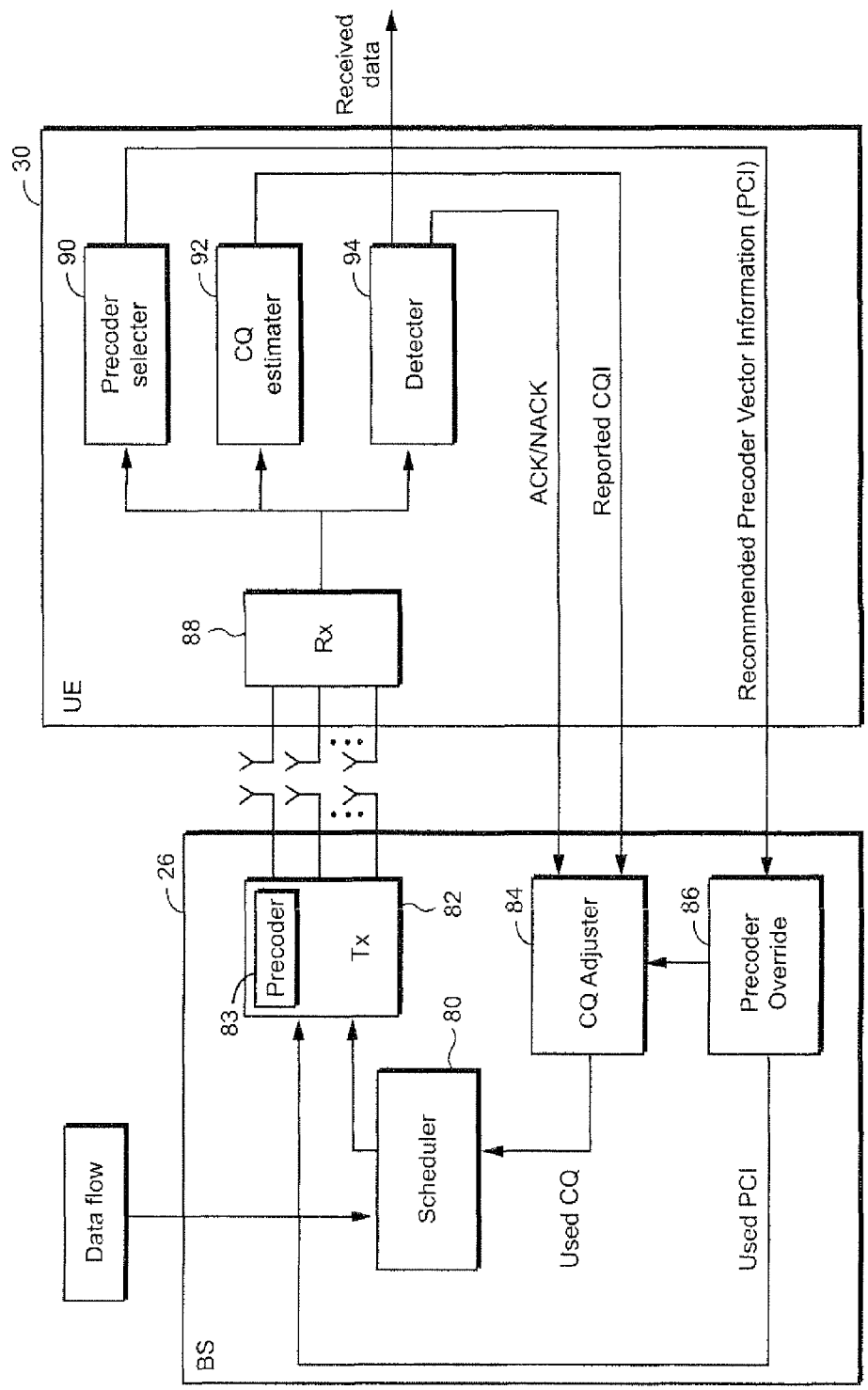
FIG. 7 is a function block diagram illustrating an example pre-coded MIMO transmission from a base station to a user equipment in accordance with the procedures outlined in FIG. 5.

FIG. 7 is a functional block diagram of a non-limiting example MIMO wireless communication system which may be used in one application to implement the procedures outlined in FIGS. 5 and 6. A base station 26 is in communication with a user equipment (UE) 30. The base station 26 includes a scheduler 80 that receives data to be transmitted from a data source with data to be transmitted to the UE 30. The scheduler provides that data to the transmitter 82 which includes a precoder 83 that precodes data streams provided for transmission in accordance with a selected precoder vector. The transmitter 82 includes multiple antennas for transmission over the radio interface to the UE. A channel quality adjuster 84 receives acknowledgement and negative acknowledgement (ACK/NACK) messages as well as reported channel quality information (CQI) from the UE 30. The channel quality adjuster 84 also receives a precoder selection input from a precoder override 86. The precoder override 86 receives recommended precoder vector information (PCI) from the UE 30. The precoder override 86 selects which precoder vector should be used for the transmission to the UE, either the recommended precoder information or an alternate precoder. Information regarding the selected precoder is sent to the precoder 83 as well as to the CQ adjuster 84. The CQ adjuster 84 then adjusts the channel quality in accordance with actually selected precoder, the reported CQI information, and reported ACK/NACK information as described above. The adjusted channel quality value is then presented to the scheduler 80 which schedules the radio resources to be used by the transmitter 83 in the MIMO data transmission to the UE 30.

The UE 30 includes a receiver 88 that includes multiple antennas. The receiver output is provided to a precoder selector 90, a channel quality (CQ) estimator 92, and a detector 94. Based on the quality of the signals received from the base station 26, the precoder selector 90 generates a recommendation of a precoder vector to be used by the transmitter 82 for subsequent transmissions, and the CQ estimator 92 generates a report that conveys channel quality information based on the detected quality of the received signals. The detector 94 demodulates the received data and sends it on for further processing. The detector 94 also detects whether the received data blocks are accurately received. Accurately received data blocks are preferably acknowledged by sending an ACK signal back to the base station. Blocks that are received with too many errors are negatively acknowledged using a NACK signal. These ACK/NACK signals are used by the CQ adjuster 84 to determine for example an actual BLER for the transmission and compare it to a target BLER and adjust the CQI to reduce the difference.

The technology in this application is advantageous because it adapts the channel quality adjustment in accordance with the precoder actually selected and used rather than assuming that the recommended precoder is always used. As a result, the BLER actually experienced for the transmission more closely tracks the desired BLER, thereby improving transmission performance and user experience at the receiver.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method of operating a first radio communication device in a wireless communication system, comprising:
   receiving recommended precoder information and channel quality information from a second radio communication device;
   wherein the recommended precoder information is associated with a recommended precoder and the channel quality information is associated with the recommended precoder,
   selecting the recommended precoder or a different, first alternate precoder for a transmission to the second radio communication device;
   determining a first channel quality adjustment if the recommended precoder is selected and a different, second channel quality adjustment if the first alternate precoder is selected;
   adjusting the channel quality information to use for transmission based on the determined channel quality adjustment;
   allocating transmission resources based on the adjusted channel quality information;
   precoding a signal to be transmitted to the second radio communications device in accordance with the selected precoder; and
   performing transmission of the precoded signal to the second radio communication device using the transmission resources allocated based on the adjusted channel quality information,
   wherein the first alternate precoder is selected for transmission to the second radio communication device.

2. The method in claim 1, wherein the recommended precoder is selected for transmission to the second radio communication device.

3. The method in claim 1, wherein the wireless communication system is a multiple-input multiple-output (MIMO) wireless communication system and the transmission is a MIMO transmission of the precoded signal.

4. The method in claim 3, further comprising:
   determining the first channel quality adjustment based on multiple prior transmissions to the second radio communications device including prior transmissions where the recommended precoder was selected, and
   determining the second channel quality adjustment based on multiple prior transmissions to the second radio communications device including prior transmissions where the first alternate precoder was selected.

5. The method in claim 1, further comprising determining the alternate channel quality adjustment based on the first channel quality adjustment combined with an offset.

6. The method in claim 5, further comprising determining the first channel quality adjustment based on multiple prior transmissions to the second radio communications device including prior transmissions where the recommended precoder was selected and prior transmissions where the first alternate precoder was selected.

7. The method in claim 6, wherein the offset is a fixed value.

8. The method in claim 6, wherein the offset is a variable value.

9. The method in claim 8, further comprising:
   determining the first channel quality adjustment based on an error rate associated with actual prior transmissions to the second radio communications device where the recommended precoder was selected and where the first alternate precoder was selected and a desired error rate, and
   determining the variable offset value based on an error rate associated with actual prior transmissions to the second radio communications device where the first alternate precoder was selected and a desired error rate.

10. The method in claim 1, wherein a second alternate precoder may be selected for a transmission to the second radio communication device, the method further comprising:
    determining a third channel quality adjustment different from the first and second channel quality adjustments if the second alternate precoder is selected.

11. The method in claim 1, wherein the first radio communication device is a base station and the second radio communication device is a user equipment terminal.

12. The method in claim 11, wherein the radio communications system is a wideband code division multiple access (WCDMA) based system.

13. Apparatus for use in a first radio communication device in a wireless communication system comprising electronic circuitry configured to:
    receive recommended precoder information and channel quality information from a second radio communication device;
    wherein the recommended precoder information is associated with a recommended precoder and the channel quality information is associated with the recommended precoder,
    select the recommended precoder or a different, first alternate precoder for a transmission to the second radio communication device;
    determine a first channel quality adjustment when the recommended precoder is selected and a different, second channel quality adjustment when the first alternate precoder is selected;

adjust the channel quality information to use for transmission based on the determined channel quality adjustment;

allocate transmission resources based on the adjusted channel quality information;

precode a signal to be transmitted to the second radio communications device in accordance with the selected precoder; and perform transmission of the precoded signal to the second radio communication device using the transmission resources allocated based on the adjusted channel quality information.

14. The apparatus in claim 13, wherein the wireless communication system is a multiple-input multiple-output (MIMO) wireless communication system and the transmission is a MIMO transmission of the precoded signal.

15. The apparatus in claim 13, further comprising determining the alternate channel quality adjustment based on the first channel quality adjustment combined with an offset.

16. The apparatus in claim 15, wherein the electronic circuitry is configured to determine the first channel quality adjustment based on multiple prior transmissions to the second radio communications device including prior transmissions where the recommended precoder was selected and prior transmissions where the first alternate precoder was selected.

17. The apparatus in claim 16, wherein the offset is a fixed value.

18. The apparatus in claim 16, wherein the offset is a variable value.

19. The apparatus in claim 18, wherein the electronic circuitry is configured to:

determine the first channel quality adjustment based on an error rate associated with actual prior transmissions to the second radio communications device where the recommended precoder was selected and where the first alternate precoder was selected and a desired error rate, and determine the variable offset value based on an error rate associated with actual prior transmissions to the second radio communications device where the first alternate precoder was selected and a desired error rate.

20. The apparatus in claim 15, wherein the electronic circuitry is configured to:

determine the first channel quality adjustment based on multiple prior transmissions to the second radio communications device including prior transmissions where the recommended precoder was selected, and determine the second channel quality adjustment based on multiple prior transmissions to the second radio communications device including prior transmissions where the first alternate precoder was selected.

21. The apparatus in claim 13, wherein the electronic circuitry is configured to:

select a second alternate precoder for a transmission to the second radio communication device, and determine a third channel quality adjustment different from the first and second channel quality adjustments.

22. The apparatus in claim 13, wherein the first radio communication device is a base station and the second radio communication device is a user equipment terminal.

23. The apparatus in claim 22, wherein the radio communications system is a wideband code division multiple access (WCDMA) based system.

* * * * *

UNITED STATES PATENT AND TRADEMARK OFFICE
CERTIFICATE OF CORRECTION

PATENT NO. : 8,112,049 B2
APPLICATION NO. : 12/640367
DATED : February 7, 2012
INVENTOR(S) : Tidestav It is certified that error appears in the above-identified patent and that said Letters Patent is hereby corrected as shown below:

In Column 6, Line 2, delete "$W_{21}$," and insert -- $W_{21}$ --, therefor.

In Column 6, Line 27, delete "$C_{12}$," and insert -- $CP_{12}$, --, therefor.

In Column 6, Line 38, delete "$W_{11}$," and insert -- $W_{11}$ --, therefor.

In Column 8, Line 15, delete "overriden." and insert -- overridden. --, therefor.

Signed and Sealed this
Ninth Day of April, 2013

Teresa Stanek Rea
*Acting Director of the United States Patent and Trademark Office*